Mar. 27, 1923.
N. W. McLEOD.
PACKING RING.
ORIGINAL FILED JUNE 13, 1921.
1,449,615.
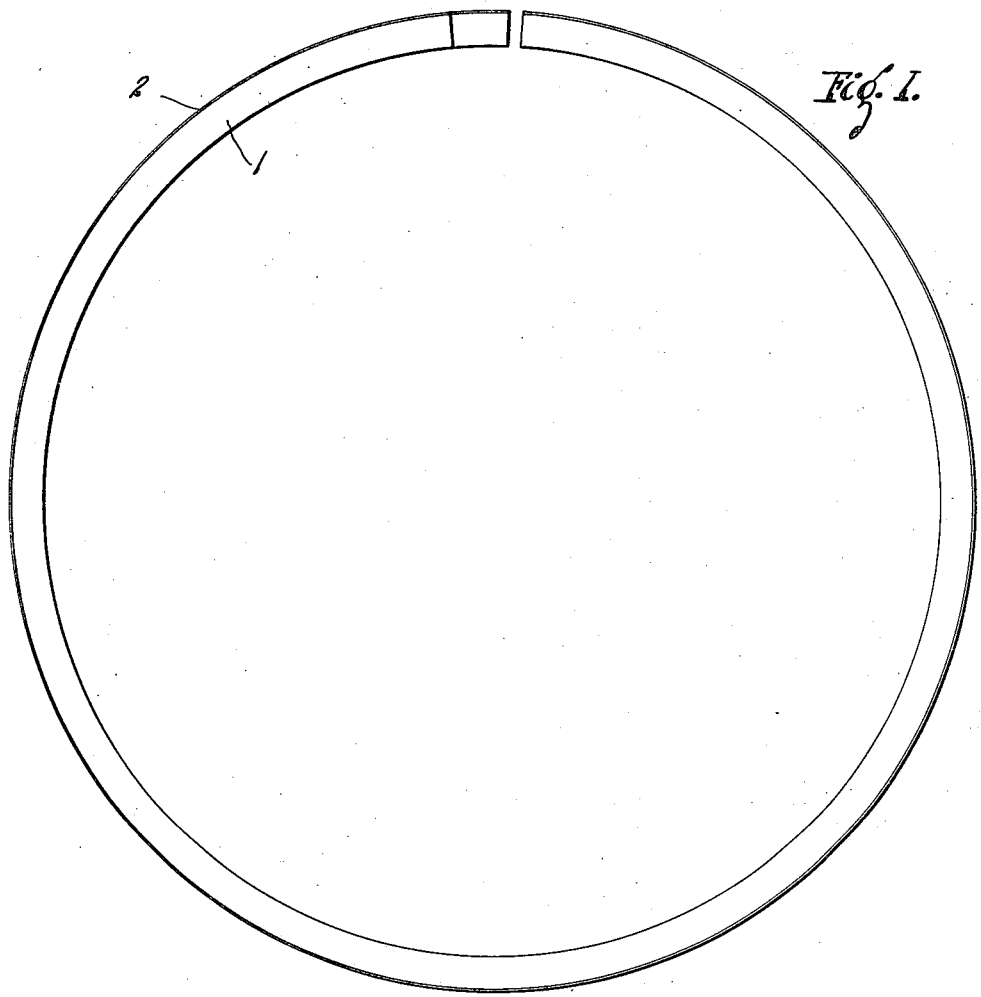
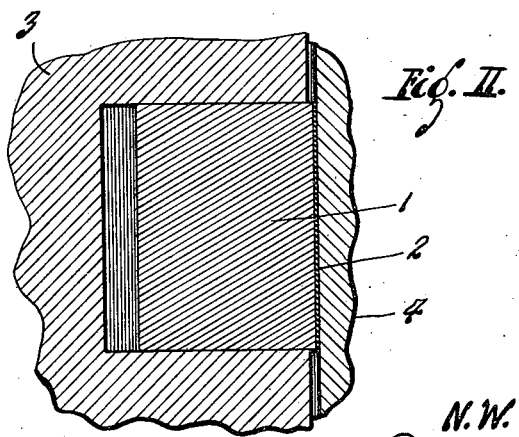
Inventor:
N. W. McLeod
By Cook & McCauley Attys.

Patented Mar. 27, 1923.

1,449,615

UNITED STATES PATENT OFFICE.

NELSON W. McLEOD, OF ST. LOUIS, MISSOURI, ASSIGNOR, BY MESNE ASSIGNMENTS, TO WALTER A. ZELNICKER, OF ST. LOUIS, MISSOURI.

PACKING RING.

Continuation of application Serial No. 477,036, filed June 13, 1921. This application filed February 14, 1922. Serial No. 536,484.

*To all whom it may concern:*

Be it known that I, NELSON W. McLEOD, a citizen of the United States of America, and a resident of the city of St. Louis, in the State of Missouri, have invented certain new and useful Improvements in Packing Rings, of which the following is a full, clear, and exact description, reference being had to the accompanying drawings, forming a part of this specification.

This invention relates to improvements in packing rings and more particularly for packing rings adapted for use in engine pistons.

Prior to this invention, engines have been provided with expanding piston rings which do not properly engage the cylinder until their peripheral faces are worn away by frictional engagement with the cylinder. When an ordinary piston ring is applied to an engine, it is necessary to operate the engine for several hours before the periphery of the ring will approximately fit the cylinder. This is, of course, undesirable and it is especially expensive in the manufacture of engines. For example, in the manufacture of internal combustion engines, it is customary to run each engine for several hours. The object of this preliminary run is to make the peripheral face of the ring conform approximately to the cylinder walls. For these reasons, automobile manufacturers prefer to use piston rings made of strong, heavy resilient material adapted to very firmly engage the cylinder walls and thereby wear away the contacting faces of the rings and cylinder walls without unnecessary loss of time. However, actual experience has shown that it is necessary to operate an engine about five hours to obtain the desired contact between the cylinder walls and the ordinary heavy expansible single rings.

An object of the present invention is to produce a packing ring which will very readily conform to and closely fit the friction surface to which it is applied. More specifically stated, an object is to produce a resilient piston ring having a friction face portions of which will quickly wear away so as to conform the face to the cylinder wall in a brief period of time, thereby eliminating the expense of a long continued preliminary operation of the engine. The body of the ring may be made of any suitable material, such as resilient cast-iron which has been found to be most desirable for piston rings, and the friction face may be made of relatively soft material. Preferably I make the thickness of the coating of soft metal such that even if completely worn off, the gap at the open ends of the ring will never exceed the limit of practical utility.

As an illustration of a simple form of the invention I have shown a cast-iron ring member having a coating of relatively soft metal cohering to its peripheral face. The soft coating is a thin-uniform film of metal preferably formed by electro-plating the cast-iron.

Figure 1 is an enlarged elevation of the piston ring embodying the features of this invention.

Figure 2 is an enlarged transverse section showing a portion of the piston in which the ring is mounted and a portion of the cylinder engaged by the ring.

1 designates a resilient ring member preferably made of cast-iron and provided with a thin, uniform coating of relatively soft metal 2 on its peripheral face. The soft metal 2 may be any one of a number of metals, such as copper or zinc, or alloys that will suggest themselves to the person skilled in the art. I prefer copper or zinc. 3 designates a portion of a piston having a groove in which the ring is mounted, and 4 designates a portion of a cylinder engaged by the soft metal coating on the periphery of the ring.

When a new ring is applied to a cylinder, it will not conform precisely to the circular inner face of the cylinder. Under ordinary conditions, a ring of this kind will initially contact with the cylinder at a few separated points, and to obtain the desired close contact around the periphery of the ring, it is necessary to operate the engine until the periphery of the ring is worn to approximately the shape of the cylinder.

The friction-responsive element 2 is a thin film of soft metal cohering to the periphery of the resilient metal body of the ring member 1. This film of metal may be applied by electro-plating the resilient ring member, and actual experience has shown that a coat of zinc, substantially 2/1000 of an inch in thickness, electroplated on the resilient cast-iron will give satisfactory results. It is not necessary to electro-plate all of the faces of the ring member, for only the periphery of the packing ring engages the cylinder, and undue wear on the side faces of the ring is undesirable.

The thickness of 2/1000 of an inch recited in the preceding paragraph constitutes only one embodiment of my invention. I do not wish to be limited to any specific dimension. In all cases, however, the thickness of the coating or layer of soft metal should be such that it will readily wear off at the points of intimate contact between the ring and the cylinder or at the points of maximum wall pressure. This will bring about the result that at the end of the preliminary run the ring presents a bearing surface which is composed partly of the hard metal and partly of the soft metal.

The thin, uniform film of soft metal 2 is firmly united with the resilient body portion of the ring, so the friction at the element 2 will not cause it to peel from the resilient metal to which it is integrally connected.

The packing ring has the usual separated ends adapted to lap each other when the ring is contracted and forced into an engine cylinder. When a new ring is placed in service, some portions of the film of soft metal will be rapidly worn away to make the ring approximately conform to the cylinder, and the friction will then be substantially uniform throughout the periphery of the ring. As the soft metal gradually wears from the ring, it is forced into the pores and minute depressions in the engine cylinder, thereby imparting a smooth glaze to the cylinder wall, and this tends to reduce the friction between the ring and the cylinder.

The very gradual wearing away of the periphery of the ring results in a slight expansion of the ring and a slight widening of the gap at the lapped ends of the ring. However, there is only a very slight increase in the width of the gap, for the thickness of the film of soft metal is such that the soft metal can be worn away without materially changing the width of the gap at the lapped ends of the ring.

While in the figures of the drawings I have shown the film of soft metal in exaggerated thickness, this has been done for illustrative purposes only.

The advantages resulting from the structure disclosed are obvious. A quick seating of the ring and a reduction of the duration of the preliminary run is one of them. With this advantage is coupled the fact that the wearing resistance of the ring in actual operation is greater than the rings hitherto used.

I claim:—

1. A piston packing ring comprising a resilient ring member, and a cylinder engaging wearing element consisting of a film of relatively soft metal uniformly coated on the periphery of said resilient ring member.

2. A piston packing ring comprising a resilient ring member, and a cylinder engaging wearing element consisting of a film of relatively soft metal electro-plated on the periphery of said resilient ring member.

3. A piston packing ring comprising a resilient ring member provided with a thin coating of soft metal on its outer face, said coating being of such dimensions that will permit it to be worn off in spots during the preliminary run on the engine.

4. A piston packing ring comprising a resilient ring member of hard metal provided with a thin coating of soft metal on its bearing face, said coating being of such dimensions that after a preliminary run the bearing surface is partly of hard metal and partly of soft metal.

5. A piston ring comprising a split ring formed of cast iron, and a coating of relatively soft quick wearing material located on its wearing face.

6. A metallic piston ring having a surface layer of a metal different from that of the body of the ring and electroplated on the latter.

In testimony that I claim the foregoing I hereunto affix my signature.

NELSON W. McLEOD.